(No Model.)
T. CROMPTON.
TEA BLENDING MACHINE.
No. 502,283. Patented Aug. 1, 1893.
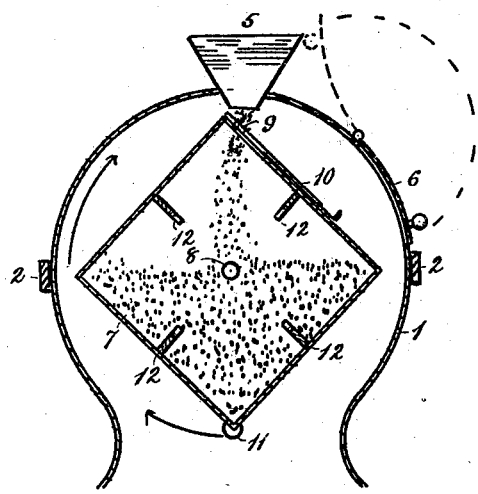
Fig. II.
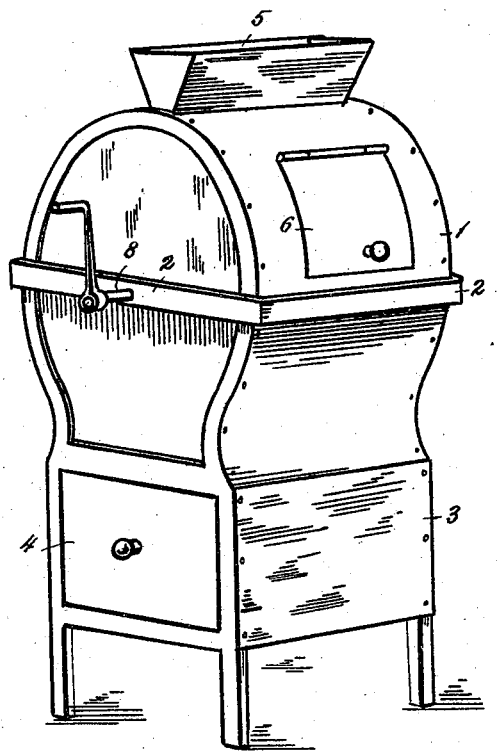
Fig. I.
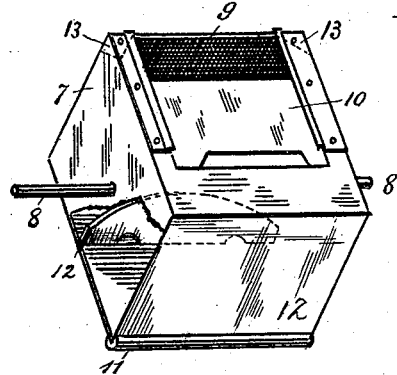
Fig. III.
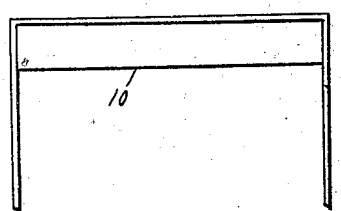
Fig. IV.
Fig. V.
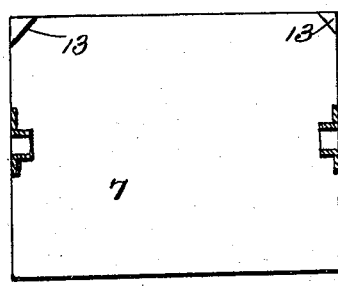
Witnesses
R. S. Millar
L. M. Adams
Inventor
T. Crompton
By J. Bailey Atty

UNITED STATES PATENT OFFICE.

THOMAS CROMPTON, OF MIDLAND, CANADA.

TEA-BLENDING MACHINE.

SPECIFICATION forming part of Letters Patent No. 502,283, dated August 1, 1893.

Application filed November 23, 1892. Serial No. 452,953. (No model.) Patented in Canada June 24, 1892, No. 39,185.

*To all whom it may concern:*

Be it known that I, THOMAS CROMPTON, a subject of the Queen of Great Britain, residing at Midland, in the county of Simcoe, Province of Ontario, and Dominion of Canada, have invented a new and useful Improvement in Tea-Blending Machines, (for which I have obtained a patent in Canada, No. 39,185, bearing date June 24, 1892,) of which the following is a specification.

Figure I is a perspective view of my improved blending machine; Fig. II, a transverse section of the same; Fig. III, a perspective view of the rectangular rotatable receptacle; and Fig. IV, a modified form of the wing. Figure V is a longitudinal section through the inner receptacle.

The special object of my invention is to provide a simple, inexpensive and effective device whereby teas of different flavors may be easily and rapidly mixed in desired proportions in such a manner as to satisfy the various requirements of all consumers. The apparatus is equally well adapted for mixing spices and other flavoring substances which are frequently used in compound form for culinary purposes.

The invention consists of a stationary cylindrical casing 1, the ends of which may be made of cast iron and the body of suitable sheet metal centrally reinforced by horizontal wooden bars 2, all supported on a stand 3 containing a drawer 4 to receive the tea after the completion of the mixing process. The cylinder is surmounted by a funnel or hopper 5 and is also provided on one side with a trap door 6. A rectangular receptacle 7 revolves within the stationary cylinder on a shaft 8 which is journaled in the bars 2. One side of this receptacle has an opening 9 to admit the tea or other material from the funnel 5. When the machine is in operation, the opening is closed by a sliding gate or cover 10 which may be conveniently manipulated by opening the trap door 6. An iron rib or weight 11 is attached to the receptacle at a point directly opposite the opening 9. By this means, when the machine is at rest, the opening registers with the funnel in the proper position to receive the tea therefrom. The interior of the receptacle is provided with wings 12 which are suitably attached in radial positions midway between the corners of the blender. The wings may be made of plain strips of sheet metal or if preferred, may be perforated or provided with scalloped edges as shown in Fig. IV. When the blending process is completed, the gate is opened and the crank turned so as to bring the opening upon the under side and into position to permit the tea to fall into the receiving drawer 4. In order to facilitate the operation, the inner receptacle is provided interiorly with inclined plates 13 which serve as guides to direct the escape of the contents and insure an entire discharge thereof. They are arranged near the opening 9, as seen best in Figs. II and V.

It will be observed that while the blender is shown and described as being rectangular, I do not confine my claim to that particular form, it being evident that any desired shape may be adopted without departing from the principle of the invention. If preferred, a less expensive construction may be attained by dispensing with the outer cylinder or casing and employing a single receptacle of any desired form.

It will be obvious that only a minimum of power is required to operate the machine and that the mixing process will be rapidly and thoroughly effected.

What I claim as new is—

The herein described tea blending machine consisting of a rotating receptacle provided interiorly with wings adapted to agitate and mix the tea, an opening on one side adapted to receive and discharge the tea alternately and a weight on the opposite side to adjust the said opening in position to receive the tea substantially as and for the purpose herein set forth.

In testimony that I claim the foregoing I have hereunto set my hand, this 3d day of November, 1892, in the presence of witnesses.

THOMAS CROMPTON.

Witnesses:
JAS. L. KEHNAN,
FRED GRISE.